United States Patent
Pan et al.

(10) Patent No.: US 9,172,638 B2
(45) Date of Patent: *Oct. 27, 2015

(54) GLOBAL IP-BASED SERVICE-ORIENTED NETWORK ARCHITECTURE

(71) Applicant: Brixham Solutions Ltd., Tortola (VG)

(72) Inventors: Ping Pan, San Jose, CA (US); Richard Gitlin, Little Silver, NJ (US)

(73) Assignee: BRIXHAM SOLUTIONS LTD., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,427

(22) Filed: Aug. 26, 2014

(65) Prior Publication Data

US 2015/0043590 A1    Feb. 12, 2015

Related U.S. Application Data

(63) Continuation of application No. 11/890,308, filed on Aug. 3, 2007, now Pat. No. 8,848,711.

(60) Provisional application No. 60/835,794, filed on Aug. 4, 2006.

(51) Int. Cl.
*H04L 12/56* (2006.01)
*H04L 12/725* (2013.01)
*H04L 12/721* (2013.01)

(52) U.S. Cl.
CPC .............. *H04L 45/304* (2013.01); *H04L 45/68* (2013.01)

(58) Field of Classification Search
None
See application file for complete search history.

(56) References Cited

U.S. PATENT DOCUMENTS

| | | |
|---|---|---|
| 5,920,705 A | 7/1999 | Lyon |
| 6,167,051 A | 12/2000 | Nagami |
| 6,347,088 B1 | 2/2002 | Katou |
| 6,430,184 B1 | 8/2002 | Robin |
| 6,546,427 B1 | 4/2003 | Ehrlich |
| 6,574,477 B1 | 6/2003 | Rathunde |
| 6,621,793 B2 | 9/2003 | Widegren et al. |
| 6,665,273 B1 | 12/2003 | Goguen et al. |
| 6,674,744 B1 | 1/2004 | Doshi et al. |
| 6,680,943 B1 | 1/2004 | Gibson |
| 6,813,271 B1 | 11/2004 | Cable |
| 6,845,389 B1 | 1/2005 | Sen et al. |
| 6,985,488 B2 | 1/2006 | Pan et al. |
| 7,050,396 B1 | 5/2006 | Cohen et al. |
| 7,200,104 B2 | 4/2007 | Saleh |
| 7,436,782 B2 | 10/2008 | Ngo et al. |
| 7,697,528 B2 | 4/2010 | Parry et al. |
| 7,990,888 B2 | 8/2011 | Nadeau et al. |
| 8,160,055 B1 * | 4/2012 | Nadeau et al. ................ 370/351 |

(Continued)

OTHER PUBLICATIONS

Shah, et al., Internet Draft, ARP Mediation for IP Interworking of Layer 2 VPN, Jul. 2007.

(Continued)

*Primary Examiner* — Hassan Phillips
*Assistant Examiner* — Saba Tsegaye
(74) *Attorney, Agent, or Firm* — Amin, Turocy & Watson, LLP

(57) ABSTRACT

Data is transferred. A data packet associated with an application flow is received. A Pseudowire label is determined based at least in part on an application header associated with the data packet. The data packet is encapsulated with the Pseudowire label. The data packet is transferred over a Pseudowire using the Pseudowire label.

20 Claims, 15 Drawing Sheets

(56) References Cited

U.S. PATENT DOCUMENTS

| | | |
|---|---|---|
| 2001/0021175 A1 | 9/2001 | Haverinen |
| 2001/0023453 A1 | 9/2001 | Sundqvist |
| 2002/0112072 A1 | 8/2002 | Jain |
| 2002/0141393 A1 | 10/2002 | Eriksson et al. |
| 2002/0146026 A1 | 10/2002 | Unitt |
| 2003/0002482 A1 | 1/2003 | Kubler |
| 2003/0039237 A1 | 2/2003 | forslow |
| 2003/0117950 A1 | 6/2003 | Huang |
| 2004/0017796 A1 | 1/2004 | Lemieux et al. |
| 2004/0105459 A1 | 6/2004 | Mannam |
| 2004/0114595 A1 | 6/2004 | Doukai |
| 2004/0133692 A1 | 7/2004 | Blanchet |
| 2004/0156313 A1 | 8/2004 | Hofmeister |
| 2004/0165605 A1 | 8/2004 | Nassar |
| 2004/0174865 A1 | 9/2004 | O'Neill |
| 2004/0196840 A1 | 10/2004 | Amrutur et al. |
| 2004/0252717 A1 | 12/2004 | Solomon et al. |
| 2005/0010685 A1 | 1/2005 | Ramnath et al. |
| 2005/0018605 A1 | 1/2005 | Foote |
| 2005/0021789 A1 | 1/2005 | Iloglu et al. |
| 2005/0044262 A1 | 2/2005 | Luo |
| 2005/0220148 A1 | 10/2005 | DelRegno |
| 2005/0237927 A1 | 10/2005 | Kano |
| 2006/0002423 A1 | 1/2006 | Rembert |
| 2006/0018252 A1 | 1/2006 | Sridhar |
| 2006/0046658 A1 | 3/2006 | Cruz |
| 2006/0047851 A1 | 3/2006 | Voit |
| 2006/0090008 A1 | 4/2006 | Guichard |
| 2006/0146832 A1 | 7/2006 | Rampal et al. |
| 2006/0182122 A1 | 8/2006 | Davie et al. |
| 2006/0227767 A1 | 10/2006 | Johnson et al. |
| 2006/0233167 A1 | 10/2006 | McAllister et al. |
| 2007/0053366 A1 | 3/2007 | Booth et al. |
| 2007/0127479 A1 | 6/2007 | Sinicrope et al. |
| 2007/0206607 A1 | 9/2007 | Chapman et al. |
| 2007/0237150 A1 | 10/2007 | Wood |
| 2008/0031129 A1 | 2/2008 | Arseneault |
| 2008/0084891 A1 | 4/2008 | Balus et al. |
| 2010/0014538 A1 | 1/2010 | Asati et al. |
| 2012/0307830 A1 | 12/2012 | DelRegno et al. |

OTHER PUBLICATIONS

Martini, et al., Internet Draft, Dynamic Placement of Multi Segment Pseudo Wires, Jul. 2007.
Martini, et al., "Internet Draft, Segmented Pseudo Wire," Jul. 2007.
Pan, et al., "Internet Draft, Pseudo Wire Protecion," Jul. 2006.
Rosen, et al., Internet Draft, PWE3 Congestion Control Framework, Mar. 2004.
Rosen, et al., BGP/MPLS IP Virtual Privae Networks (VPNs), Feb. 2006.
Martini, et al., Pseudowore Setup and Maintenance Using the Label Distribution Protocol (LDP), Apr. 2006.
Ping Pan, internet Draft, Dry-Martini: Supporting Pseudo-wires in Sub-IP Access Networks, Jul. 2005.
McPherson, et al., Pseudowire Emulation Edge to Edge (pwe3) Jun. 13, 2007, http://www.ietf.org/html.charters/pwe3-charter.html.
Vasseur, et al., Path Computation Element (pce), May 9, 2007, http://www.ietf.org/html.charters/pce-charter.html.
Chen, The LSP Protection/Restoration Mechanism in GMPLS, InternetCitation, Online, Oct. 2002 (Oct. 1, 2002) XP002239552. Retrieved from Internet URL http://www.site.uottawa.ca/'bochmann/dsrg/PublicDocuments/Master-theses/Chen,%20Ziying%20%20-%202002.pdf.
Afferton, Ethernet Transport over Wide Area Networks, Packet-Aware Transport for Metro Networks, IEEE Communications Magazine, pp. 120-127, Mar. 2004.
Anderson, et al., LDP Specification, Network Working Group, Jan. 2001.
Martini, et al., Encapsulation Methods for Transport of Ethernet over MPLS Networks, Network Working Group, Apr. 2006.
Martini, et al., Encapsulation Methods for Transport of Frame Relay Over MPLS Networks, Network Working Group, Feb. 2006.
Metz, et al., Pseudowire Attachment Identifiers for Aggregation and VPN Autodiscovery, PWE3 Working Group, Feb. 25, 2006.
Martini, et al., Dynamic Placement of Multi Segment Pseudo Wires, PWE3 Working Group, Jun. 2006.
Martini, et al., Pseudowire Setup and Maintenance using LDP, Network Working Group, Mar. 2005.
Braden, et al., "Integrated Services in the Internet Architecture: an overview", Network Working Group, Jun. 1994.
Bryant, et al., "Pseudo Wire Emulation Edge-to-Edge (PWE3) Architecture", Network Working Group, Mar. 2005.
Blake, et al., "An Architecture for Differentiated Services," Networ Working Group, Dec. 1998.
Theimer, et al., "Requirements for OAM Functionality in MPLS", Oct. 1999, Watersprings.
Harry Newton, "Newton's Telecom Dictionary", 23rd Updated and Expanded Edition, p. 825, p. 239, Flatiron Publishing, New York, Mar. 2007.
Office Action dated Jun. 30, 2011 for U.S. Appl. No. 11/890,308, 9 pages.
Office Action dated Jan. 5, 2011 for U.S. Appl. No. 11/890,308, 8 pages.
Office Action dated Jul. 19, 2010 for U.S. Appl. No. 11/890,308, 8 pages.
Office Action dated Sep. 25, 2009 for U.S. Appl. No. 11/890,308, 7 pages.
Office Action dated Jul. 31, 2012 for U.S. Appl. No. 11/890,308, 12 pages.
Office Action dated Jan. 11, 2012 for U.S. Appl. No. 11/890,308, 9 pages.
Office Action dated Oct. 24, 2013 for U.S. Appl. No. 11/890,308, 23 pages.
Office Action dated Feb. 6, 2013 for U.S. Appl. No. 11/890,308, 11 pages.

* cited by examiner

GLOBAL IP-BASED SERVICE-ORIENTED NETWORK ARCHITECTURE

CROSS REFERENCE TO OTHER APPLICATIONS

This application is a continuation of, and claims priority to, U.S. patent application Ser. No. 11/890,308, filed on Aug. 3, 2007, now U.S. Pat. No. 8,848,711 and entitled, "GLOBAL IP-BASED SERVICE-ORIENTED NETWORK ARCHITECTURE," which claims priority to U.S. Provisional Patent Application No. 60/835,794, filed on Aug. 4, 2006, and entitled "GLOBAL IP-BASED SERVICE ORIENTED NETWORK ARCHITECTURE OVERVIEW AND IMS USER CASE." The entireties of these related applications are incorporated herein by reference.

BACKGROUND OF THE INVENTION

Providing new services may face challenges in creating a common service conception diversely owned and multi-technology network of the future. The following are examples of potential challenges:

1. Access/metro and backbone networks may belong to different carriers or business entities. For example, the access networks may belong to wireless service providers, while the backbone networks may belong to a national or global carrier that provides data transport services to multiple access or metro networks.

2. There may be underlying data transport technology differences among providers and also often between metro/access and core networks of the same provider.

3. The combination of ownership diversity and technology diversity is reflected in a more complex set of management interfaces to control infrastructure, and this complexity may create problems if it is reflected upward to the service, business, and operations management layers.

4. There may be a considerable variability in the "value" of service relationships and thus in the per-service handling that can be justified. Some customer data flows may be handled individually (video, for example) and others may likely be handled in aggregated form (voice).

5. There may be regulatory issues such as intercept/surveillance that may have to be applied, or that may have to be routed around to avoid.

6. Since user traffic is transported as IP packets throughout the network, the backbone carriers may not have the ability or incentive to provide special treatment to important user flows. Subsequently, "hot-potato" type routing polices are applied to inter-carrier traffic. The end users can only rely on application-level congestion and flow control, such as TCP, to regulate traffic. This practice may not likely scale or economical as end-user applications become more bandwidth-intensive and delay-sensitive.

7. There may be business issues associated with route selection that cannot be reflected in ordinary IP route processing using mechanisms like OSPF or IS-IS.

8. Services may have to be created at the network edge and border. Service providers may offer new services, such as voice, video, security and VPN, from a network edge. Given the competition from application service providers, the cost in operation may become an issue.

Solutions to one or more of these problems would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
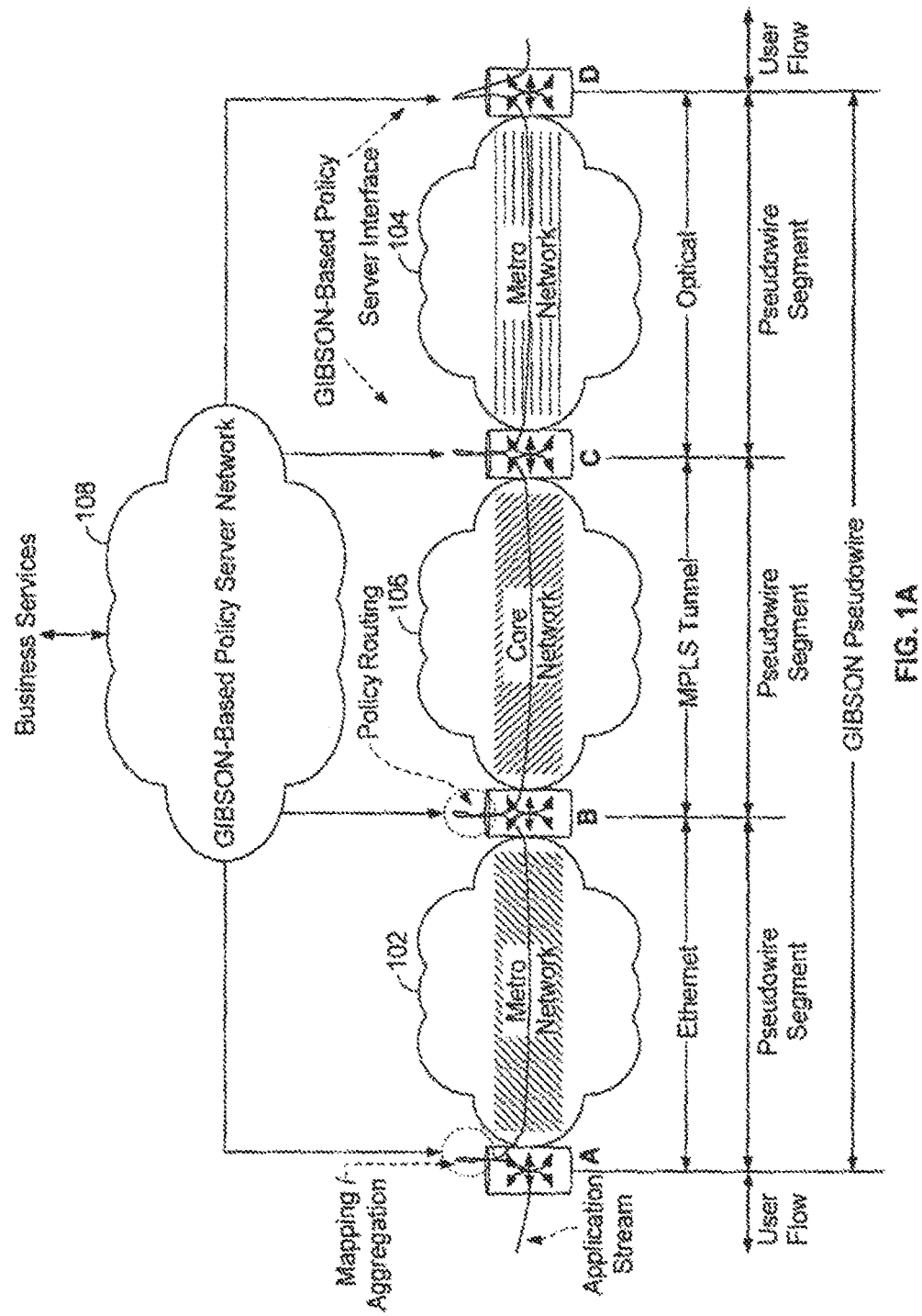
FIG. 1A is a diagram illustrating an embodiment of a service facilitation architecture.

FIG. 1A is a diagram illustrating an embodiment of a service facilitation architecture. In this example, a service facilitation layer is built above some network protocols but maps downward to other network technologies. An expansion to the Pseudowire specification may enable this new layer to create all of the service relationships (e.g. point-to-point, multipoint, etc.) and support a full range of business and residential services. In some embodiments, controlling this layer requires a single management interface per provider jurisdiction, and this may reduce operations cost and complexity. As used herein, this new architectural layer is referred to as GIBSON (Global IP-Based Service-Oriented Network).

The GIBSON architecture provides a solution for providers to transport service-guaranteed user traffic over a multi-provider network. In some embodiments, it interfaces with a provider's management plane for service discovery and mapping, and leverages standard-based MPLS Pseudowire techniques to interface with network routers and switches. The GIBSON architecture binds business services to a network data-plane, and enables providers to provision, manage and monitor customer waffle for new service, such as IMS and VoD (video-on-demand), or other services.

For purposes of explanation, IMS-based management-plane techniques may be used in some of the examples described herein; however, in various embodiments, any appropriate policy server network and business policies may be used.

The GIBSON architecture may include one or more of the following features:

1. Open interface for business service creation and provisioning
2. Operate in both intra-provider and inter-provider environment
3. Provide consistent edge-to-edge per-flow forwarding behavior
4. Flow type agnostic capable of processing flows in any format
5. Support for "nesting" of Pseudowires to facilitate traffic management and virtual service creation
6. Independent of underlying network transport tunneling mechanism
7. Applicable to all service devices, with less dependency on IP routing To achieve the above claims, GIBSON in some embodiments defines a set of rules for interfacing with network edge nodes, and leverages and extends the MPLS PWE3 mechanism for data transport and network device interfacing.

For example, as drown in FIG. 1A, a provider network consists of two access networks 102 and 104 and one core network 106, running Ethernet, optical (SONET/SDH) and IP/MPLS, respectively. Each network uses different underlying data transport technology, and is administrated separately. A provider needs to support multiple services, including private leased line, video distribution and residential broadband data access.

In the example, the provider is to deliver high-quality, high-premium and long-duration video streams between end users. Through business arrangements and network planning, the provider decides to deliver user video traffic over border node A, B, C and D. Between each pair of border nodes, there may be multiple routers and switches operating with different types of control protocols. The network between A and B may be Ethernet network running IEEE 802.1ah Provider Backbone Bridging (PBB) and Provider Backbone Transport (PBT), the network between B and C may be running MPLS traffic engineering, and, finally, the network between C and D may operate over GMPLS.

The provider enables GIBSON-based policy server network 108 to distribute policy information. At connection setup time, GIBSON-based policy server network 108 may download the service-specific parameters, such as packet identification (e.g., RIP port numbers), a globally unique flow-id, and QoS information to edge nodes A and D. Further all the nodes may get policy routing information from GIBSON-based policy server network 108. Each policy routing entry has information such as "for flow-id X, go to node Y".

In this example, upon the reception of policy information, edge node A may trigger the establishment of an MPLS Pseudowire as defined in IETF PWE3 WG. The Pseudowire setup sequence may follow the sequence as defined in the IETF standard body. Specifically, the Pseudowire type may be IP as defined in the IETF standard titled "ARP Mediation for IP Interworking of Layer 2 VPN". Setting up Pseudowires with QoS has been defined in the IETF standard titled "Dynamic Placement of Multi Segment Pseudo Wires".

When the Pseudowire setup messages arrive at node B or C, the node may extract the flow-id information, search the policy routing database provided by GIBSON-based policy server network 108, and route the Pseudowires accordingly. This may result in an edge-to-edge multiple-hop Pseudowire from A to D through B and C.

For instance, when multimedia traffic arrives at edge nodes A and D, they may map incoming packets that have the seine RIP pert numbers as provided from GIBSON-based policy server network 108 to the established Pseudowire. At each hop, the traffic may receive the QoS guarantees as specified by the Pseudowire.

As shown in the example, GIBSON interfaces with policy server network 108 and leverages Pseudowire technology to guarantee service-oriented traffic over the network. The Pseudowires that operate in the context or GIBSON are referred to herein as "GIBSON Pseudowires", which is more fully described below.

In various embodiments, each of nodes A-D may be an IP router, Ethernet switch, other switch, session border controller (SBC), server, end user client, a personal computer (PC), etc. In various embodiments, networks 102, 104, and 106, may operate using a variety of network technologies, such as IP, Layer 2 Ethernet, MPLS, etc. Each network may have one or more pre-established tunnels.

In some embodiments, business policies are downloaded to one or more of edge nodes A-D. In some embodiments, the business policies are periodically downloaded. In some embodiments, the business policies are event triggered. For example, an edge node may request at least a portion of a business policy and receive it in response to the request.

In this example, traffic flow is bidirectional; that is an application flow may go from node A to node D or vice versa. However, the GIBSON concept could apply to both bidirectional and unidirectional traffic.

Figure 1B:
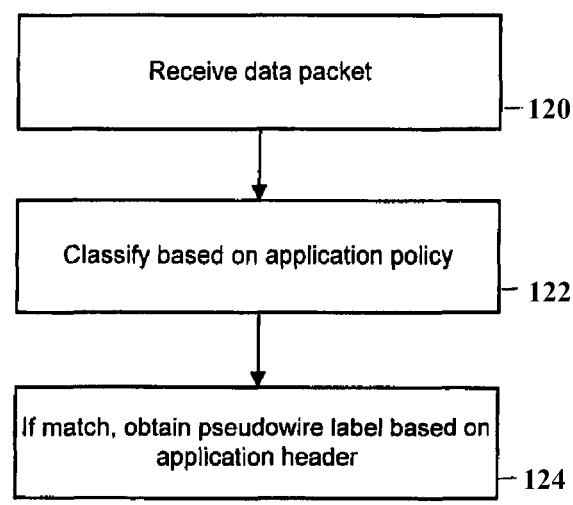
FIG. 1B is a flowchart illustrating an embodiment of a process for receiving a data packet at an ingress node.

FIG. 1B is a flowchart illustrating an embodiment of a process for receiving a data packet at an ingress node. For example, this process may be performed at node A or D in FIG. 1A, if an application stream is sent from node A or node D, respectively.

At 120, a data packet is received. For example, at node A, a data packet associated with an application stream is received. The application stream is associated with a service, such as VoIP, video, or applications such as web 2.0. At 122, the data packet is classified based on an application policy. For example, the packet is inspected and compared against preloaded business arrangement policy information to see if it belongs to a particular flow. If the data packet satisfies a business arrangement, at 124, a Pseudowire label is obtained based on the application header. A mechanism for obtaining Pseudowire labels is defined in IETF. However, the GIBSON architecture includes the action of mapping application flows into Pseudowires. The data packet is encapsulated with the Pseudowire label. The data packet is aggregated into a transport tunnel that is prearranged by the provider. Examples of transport network tunnels include Ethernet VLAN, optical DWDM cross connection, or IP/MPLS LSP (label switched path). The data packet is transferred over a Pseudowire in the transport tunnel using the Pseudowire label. En some embodiments, each application stream is associated with a different Pseudowire or Pseudowire label. This can be done by encapsulating the packet based on the application header, such as an TCP, HTTP, or MPEG header. Thus, each application flow is unique to a Pseudowire label. In contrast, some Pseudowires are encapsulated based on IP or layer 2 headers only. In some embodiments, one or more headers associated with layer 4 and above are used to obtain a Pseudowire label for the packet.

Figure 1C:
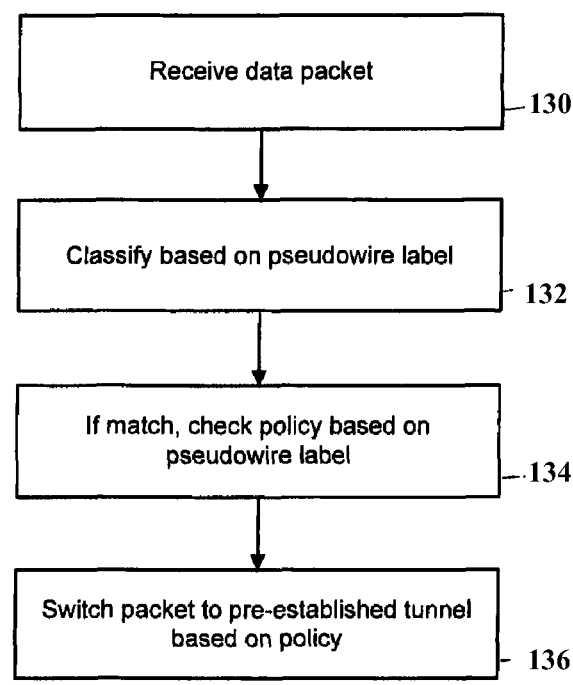
FIG. 1C is a flowchart illustrating an embodiment of a process for receiving a data packet at a transit node.

FIG. 1C is a flowchart illustrating an embodiment of a process for receiving a data packet at a transit node. For example, this process may be performed at node B or C in FIG. 1A, if an application stream is sent from node A to node D or vice versa. The transit node is sitting between two or more networks that operate with different technologies.

At 130, a data packet is received. For example, at node B, a data packet associated with an application stream is received. For example, the data packet could be a data packet sent at 124 in FIG. 1B. At 132, the data packet is classified based on the Pseudowire label. At 134, a policy is checked based on the Pseudowire label. For example, the transit node interfaces with a policy server to determine where to switch the packet and what kind of service agreement needs to be enforced. At 136, the packet is switched to a pre-established tunnel based on the policy. For example, the packet is switched based on the Pseudowire application label. Further, bandwidth enforcement, and/or traffic shaping may be performed here.

In the case of a transit node, in this example, classification is based on the Pseudowire label only for the purpose of the ease of operation, in contrast to the case of an ingress node, in which classification is based on the application. By checking a policy or interfacing with a policy server, the data packet can be switched based on business policies in addition to (or instead of) just using topology routing to switch the packet.

Figure 1D:
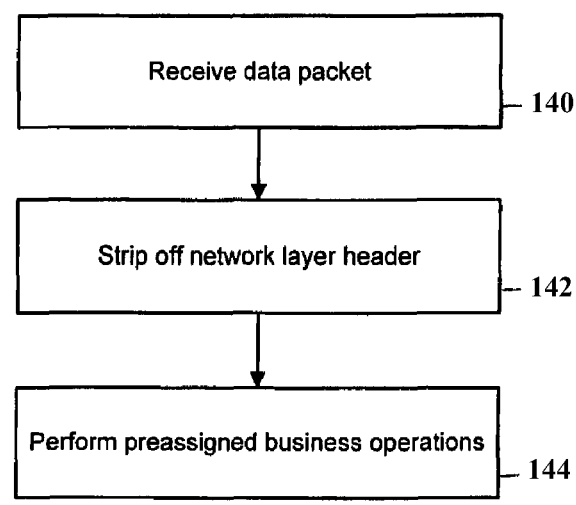
FIG. 1D is a flowchart illustrating an embodiment of a process for receiving a data packet at a termination or egress node.

FIG. 1D is a flowchart illustrating an embodiment of a process for receiving a data packet at a termination or egress node. For example, this process may be performed at node D in FIG. 1A, if an application stream is sent from node A to node D.

At 140, a data packet is received. For example, at node D, a data packet associated with an application stream is received. For example, the data packet could be a data packet sent at 136 in FIG. 1C. At 142, the network layer header is stripped off or removed. At 144, preassigned business operations are performed. For example, QoS, bandwidth enforcement, and/or traffic shaping are performed. The termination node has sufficient security information to prevent denial of service (DoS) attacks as part of a business arrangement.

The GIBSON architecture uses Pseudowires to transport data packets over multiple networks; however, it extends the use of the Pseudowire concept as defined in IETF PWE3 WG, to handle upper layer (that is, above IP) applications, such as video and voice. Pseudowires operating with the newly defined extension in operation are referred to as "GIBSON Pseudowires".

The extension is in the method of packet classification. Instead of looking through Layer-1 or Layer-2 headers as IETF PWE3 WG defines Pseudowires, GIBSON Pseudowires search through application headers to identify data flows. In some embodiments, the application information is located above the IP headers.

When an application data flow has been identified, the devices supporting GIBSON architecture will encapsulate all packets that belong to the specific flow in an IP Pseudowire and transport them over the provider networks.

Figure 2:
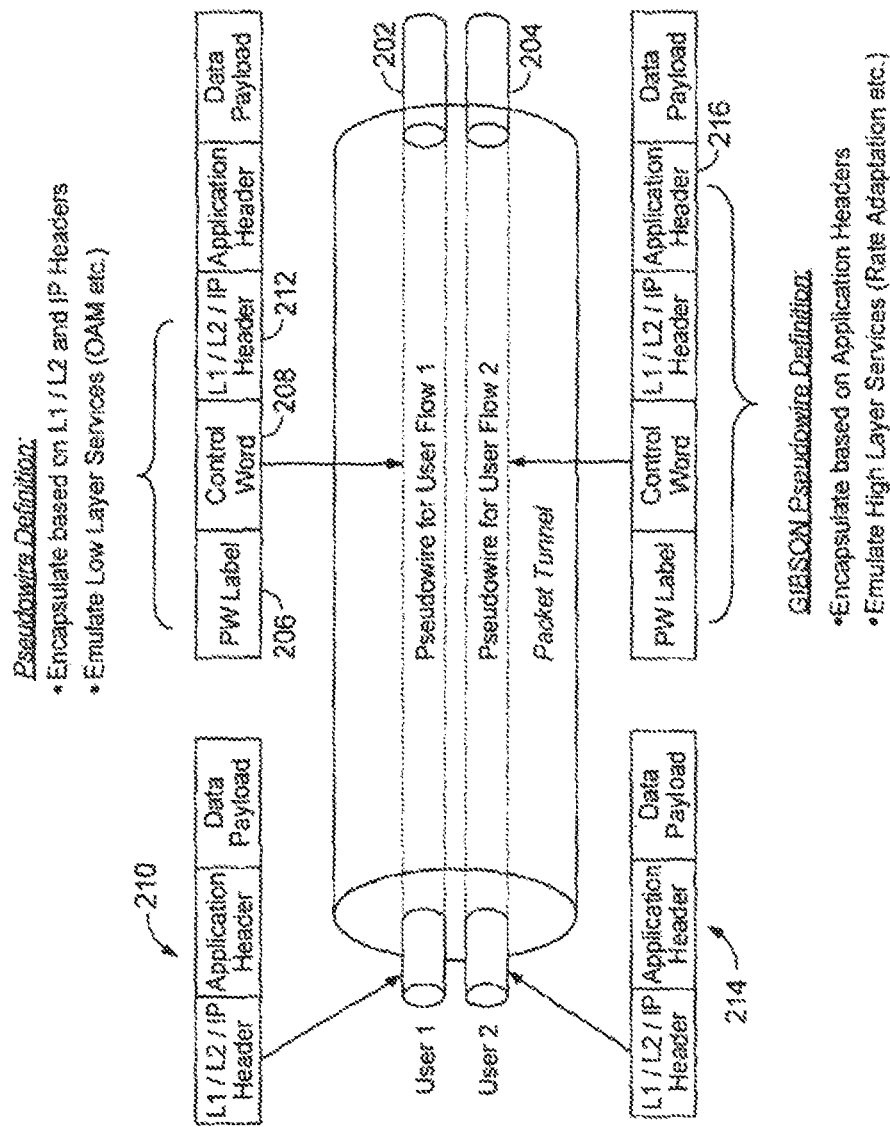
FIG. 2 is a diagram illustrating an embodiment of a GIBSON Pseudowire.

FIG. 2 is a diagram illustrating an embodiment of a GIBSON Pseudowire.

In this example, an example Pseudowire is shown, which works as follows; to aggregate data flows over a shared physical or logical tunnel between network edges, the ingress edge node encapsulates a Pseudowire header to the packets. This header consists of a Pseudowire label 206, and a control word 208. At the egress edge node, it may strip off the header, and forward the original packets. Each individual data flow has a unique Pseudowire label 206. The control word 208 can be used for congestion control and OAM purposes. The edge nodes use MPLS signaling protocols to set up Pseudowires over the network.

Some features of Pseudowires include the ability to switch Pseudowires at a network edge, provide QoS and OAM on a per-Pseudowire basis, and support for protection and restoration. For example, IETF PWE3 WG defines some of these features.

Pseudowires have the following characteristics:

Transport agnostic: Pseudowires can transport data traffic over any physical or logical data tunnel which may be IP, MPLS, Ethernet, or optical cross-connection.

IP-friendly: Pseudowires are provisioned, controlled and operated via IP control plane Inter-network capable: PWE3 multi-hop (IETF Draft, L. Martini, et al, "Dynamic Placement of Multi Segment Pseudo Wires") and switching (IETF Draft, L. Martini, et al, "Segmented Pseudo Wire") techniques enable providers to provision Pseudowires over multiple intra-domain or inter-domain networks.

VPN Pseudowire has been extended in IETF to create a nested topology for VPN applications, which include VPLS, VPWS and IPLS.

SLA capable: Pseudowire techniques can provide QoS (IETF Draft, L. Martini, et al, "Dynamic Placement of Multi Segment Pseudo Wires"), protection and restoration (IETF Drat P. Pan, et al, "Pseudowire Protection") and congestion control (IETF Draft, P. Pan, et al, "Pseudowire Congestion Control") functionality on a per-flow basis.

Flow type agnostic: per IETF PWE3 WG, Pseudowires can encapsulate any type of Layer-1 and Layer-2 data flow. Pseudowires can encapsulate Layer-1 flows in SONET/SDH format (the technique is known as Circuit Emulation), Layer-2 flows such as ATM, Frame Relay, PPP and Ethernet, and IP, in some embodiments, all packets within a Pseudowire receive the same packet forwarding treatment throughout the network.

Based on the last point, GIBSON Pseudowires add an application-awareness dimension to Pseudowires. The deployment of new data services may require service providers to control and manage user traffic at per-application-stream granularity. An application stream may be encapsulated in RIP for session-based applications such as VoD and VoIP, or in MPEG for multimedia applications.

Multimedia applications may bring an entirely different set of service requirements to provider networks. For example, some applications can tolerate out-of-order packet delivery, some applications can tolerate packet drop, but not delay, and some applications require user traffic to adapt to a change of available link bandwidth, but maintain constant-bit-rate at all times. The existing Layer-2 and Layer-3 QoS mechanisms (IEEE 802.1p or DiffServ) may not be adequate to handle such applications.

To support the new services, GIBSON Pseudowires extend the concept of IETF PWE3 WG Layer-1 and Layer-2 based Pseudowires, and add a new dimension for new applications. GIBSON Pseudowires may include the following attributes:

GIBSON Pseudowires map and aggregate data flows from any layer (i.e., layer 1 to 7). The number of user flows to be aggregated into each Pseudowire depends on the service. For example, for high-bandwidth and long-duration VoD streams, the edge nodes may initiate and maintain one Pseudowire per stream. For low-speed and short-lived VoIP sessions, the edge nodes may aggregate a large number of sessions into a single Pseudowire. Once again, all packets within each Pseudowire may receive the same SLA treatment throughout the network.

At a network border, GIBSON Pseudowires are switched based on business-driven routing. As shown in FIG. 1A, nodes B and C are situated at the border between metro and core networks, and are connected to edge nodes A and B over physical or logical tunnels. When they receive data packets from GIBSON Pseudowires, the Pseudowire traffic is forwarded to other tunnels based on the business bilateral/multilateral agreement.

As shown in FIG. 2, Pseudowire 202 encapsulates data packet 210 based at least in part on layer 1/layer 2 and IP header 212. By contrast, Pseudowire 204 encapsulates data packet 214 based at least in part on application header 216. As a result, Pseudowire 204 is unique to an application stream associated with data packet 214.

Another concept in the GIBSON architecture is the definition of business policy interfacing between the management-plane and network nodes.

In some applications, such as IMS, the user flow and QoS information may be derived from the management plane. The information can be piggybacked by the Pseudowire-initiating GIBSON-enabled devices into the setup messages. The transit network nodes may use this information for routing. Another alternative is to store the QoS information on each provider's Router Servers.

Figure 7:
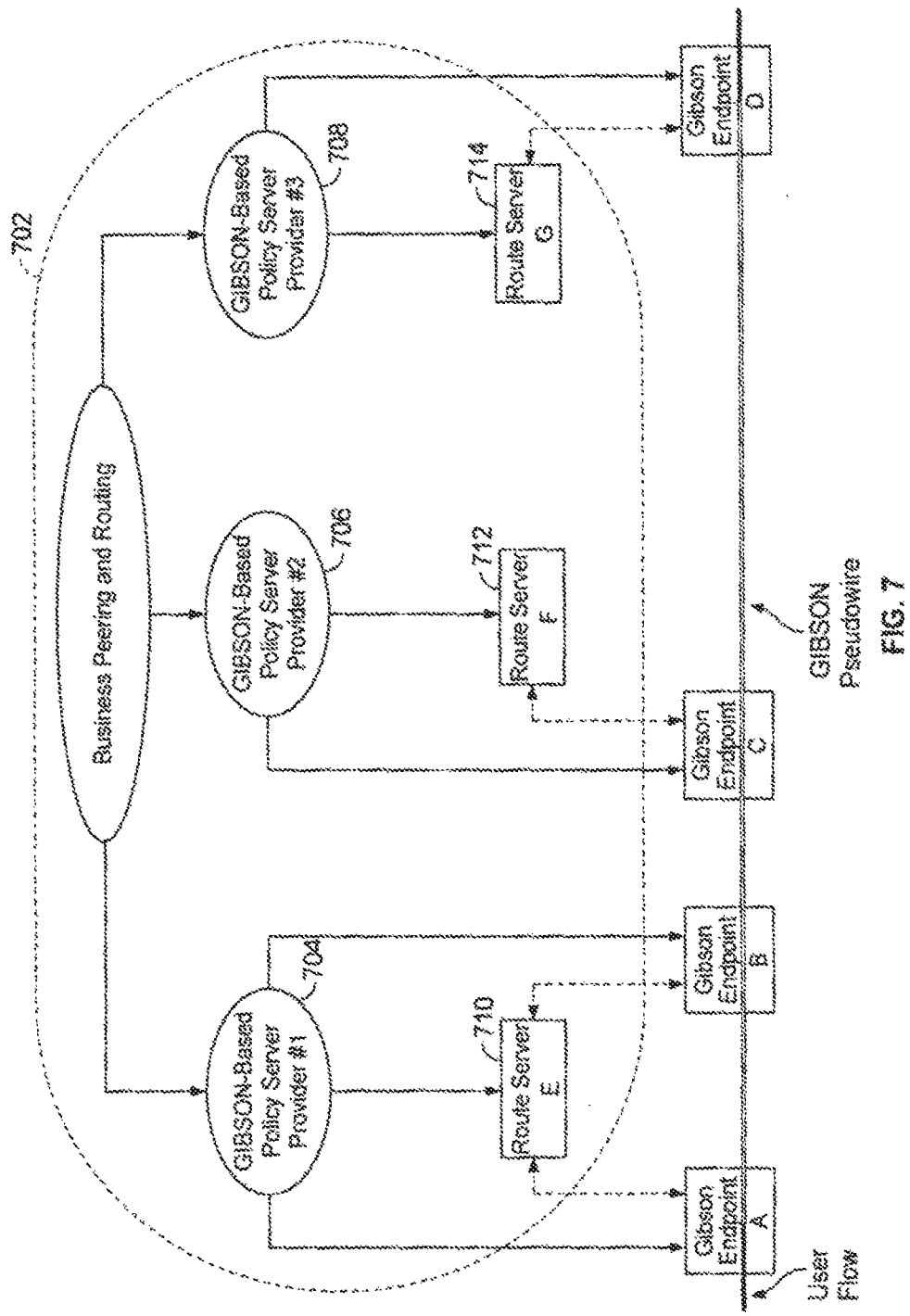
FIG. 7 is a block diagram illustrating an embodiment of the operation of GIBSON-based Pseudowire routing.

FIG. 7 is a block diagram illustrating an embodiment of the operation of GIBSON-based Pseudowire routing. Network 702 is an example of GIBSON-based policy server network 108.

There are two types of routing in this example: business-based, and topology-based. Business-based routing is conducted between service providers 704-708. As shown here, providers 1, 2 and 3 define the business routing constraints from their inter-provider bilateral or multilateral agreement. Through the management-plane, the business routing constraints may be downloaded to Route Servers 710-714 within each provider network. Thus, a centralized policy is distributed to multiple GIBSON endpoints.

An example Router Server can be the one defined and studied in IETF PCE WG. It is to combine business routing constraints and network internal topology and resource information, and compute the optimal path between network edges.

In the context of GIBSON, it does net define the messaging protocols between the management-plane and network nodes. Rather, GIBSON defines the content of the business policies and how they are processed on network nodes.

In FIG. 7, there may be multiple routers and switches between GIBSON Endpoints A-D. After mapping the data flow into Pseudowires, GIBSON Endpoint A may interface with Route Server E to find a suitable path to GIBSON Endpoint B. On transit GIBSON Endpoint C, it may again interface with Route Server F for the optimal path to reach GIBSON Endpoint D. This is how inter-domain GIBSON Pseudowires are established in some embodiments.

There are two groups of policies:

(a) The pre-negotiated business policies among providers 704-707, which include application-level policies and inter-provider policies.

(b) The internal network engineering (such as routing) policies within each provider 704-707

The eventual policies received by GIBSON nodes A-D are a combination of (a) and (b) above.

An example elan interprovider bilateral policy is the following:

For traffic going two Providers A and Provider B,

All voice traffic must traverse through Provider C with the following constraints:

(i) via a pre-established data tunnel Ethernet-Connection-X (ii) the maximum bandwidth for the voice traffic is 150 Mbps (iii) the maximum number of simultaneous voice session is 5,000

(iv) a small amount of packet loss, in the range of 0.3-0.5% of the total traffic, is permitted in case of network congestion, however, all packets must not experience any queuing delay during transmission due to the delay-sensitive nature of voice traffic (v) the above criteria always applies to bi-directional traffic All video traffic must traverse through Provider D with the following constraints:

(i) via a pre-established optical tunnel DWDM-Connection-Y (ii) the maximum bandwidth for the video traffic is 20 Gbps (iii) the maximum number of simultaneous video session is 5,000

(iv) some packet delay, in the range of 50-200 msec, is permitted in case of network congestion, however, no packet can be dropped throughout the transmission due to the loss sensitivity of video traffic (v) the above criteria only applies to uni-directional traffic An example of an application policy at node A is the following:

For video flow from YouTube (IP address=1.2.3.4), with RIP session information of source port=10, destination port=20, (i) transmit packets to Node B through Pseudowire with a specifically allocated Pseudowire label (ii) use at most 10 Mbps from 1:00 am to 4:00 pm, after which release all network resources including bandwidth and Pseudowire labels (iii) to transport through the provider networks, use the interprovider policy and direct the traffic through DWDM-Connection-Y (see above interprovider policy example)

Upon the reception of the policies, the GIBSON-enabled network nodes will apply the policies in its packet classification and QoS, as described previously.

Figure 3:
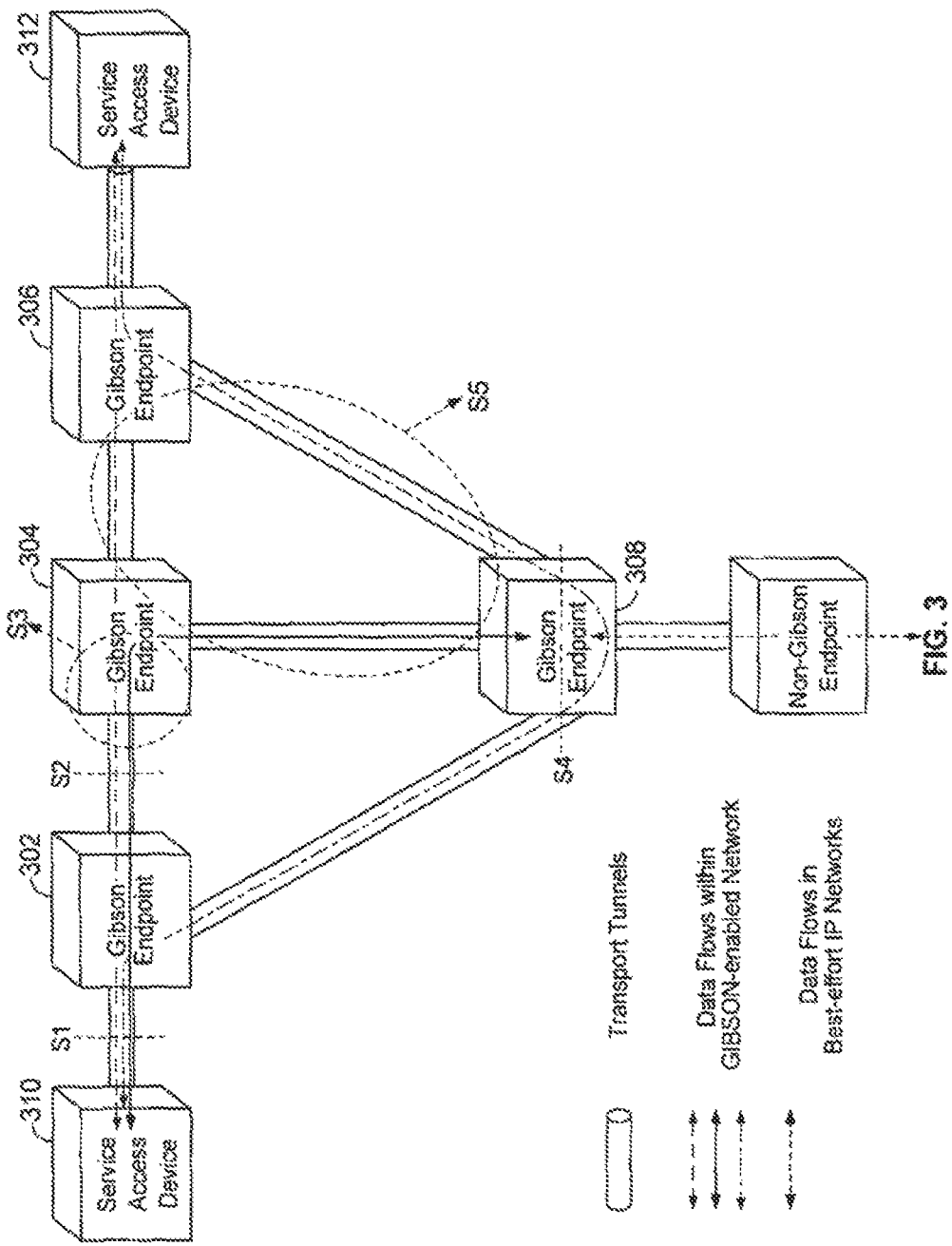
FIG. 3 is a diagram illustrating an embodiment of a GIBSON architecture.

FIG. 3 is a diagram illustrating an embodiment of a GIBSON architecture. In the example shown, GIBSON endpoints (or GIBSON-Enabled Nodes) 302-308 are devices that are responsible for processing user data flows by interfacing with a GIBSON-based policy server network. Between GIBSON endpoints, there can be one or multiple networks. GIBSON endpoints always operate at a network edge and/or border.

Interfaces in the GIBSON architecture are indicated by S1, S2, S3, S4, and S5. S1 is an access interface, S2 is a data aggregation interface, S3 is a Pseudowire routing interface, S4 is a Pseudowire termination interface, and S5 is a multi-point transport interface. In some embodiments, in GIBSON-enabled networks, all data flows, best-effort or otherwise, are provisioned and established through the interface with a GIBSON-based policy server network.

Figure 4:
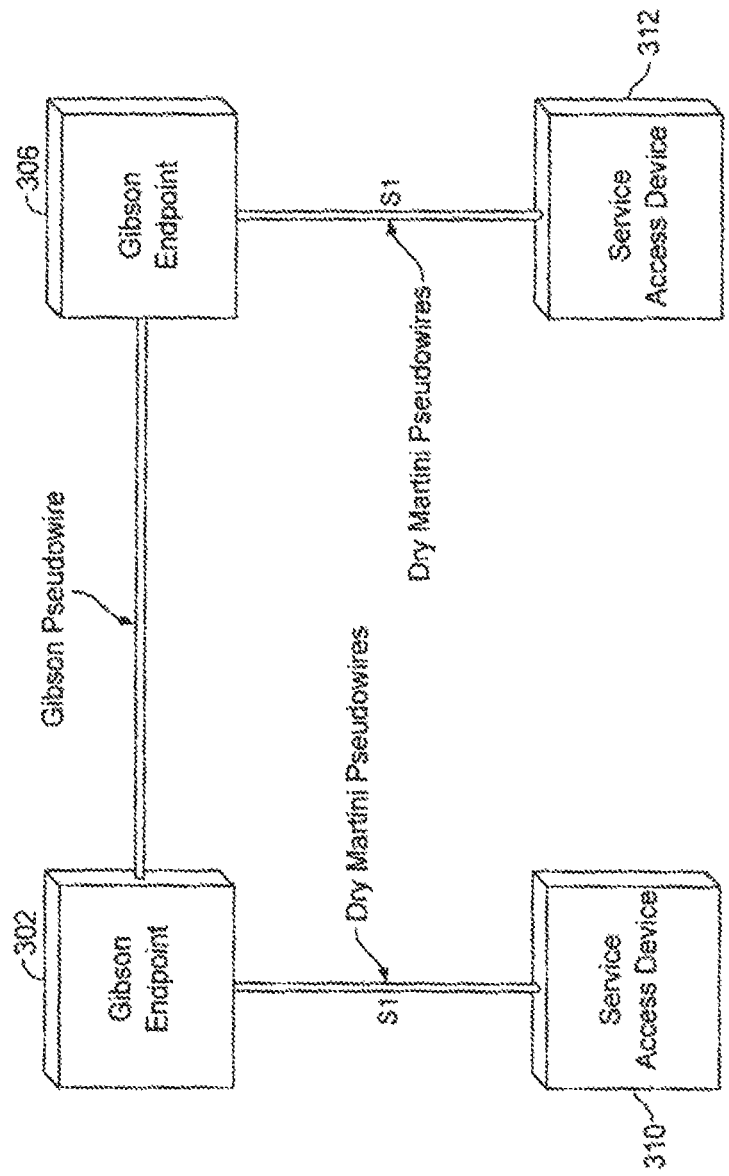
FIG. 4 is a diagram illustrating an embodiment of a GIBSON S1 interface.

FIG. 4 is a diagram illustrating an embodiment of a GIBSON S1 interface. In the example shown, GIBSON Endpoints 302 and 306 aggregate user flows itom service access devices 310 and 312. The service access devices 310 and 312 may include a wide range of equipment including IP DSLAM, PON, SONET-SDH MSPP and wireless base-stations. The service access devices 310 and 312 do not need to be fully IP routing capable. They are efficient in supporting the services that they are designed for in some embodiments.

In various embodiments, service access devices 310 and 312 can deliver user flows in any native format (such as Ethernet VLAN and IP). Upon the reception of user flows from service access devices, GIBSON endpoints 302 and 306 classify the incoming traffic based on application criteria provided from the management-plane.

For example, two service access 310 and 312 have established an IMS session via SIP. To provide service guarantees, the GIBSON Endpoints 302 and 306 may read the IP source and destination address, and UDP source and destination port numbers for each incoming packet, and match theca against customer flow policies. If there is a match, GIBSON Endpoint 302 or 306 may encapsulate the packet with a Pseudowire header, and forward it over a pre-established Pseudowire. Each Pseudowire is provisioned with the SLA parameters provided by the management-plane.

Figure 5:
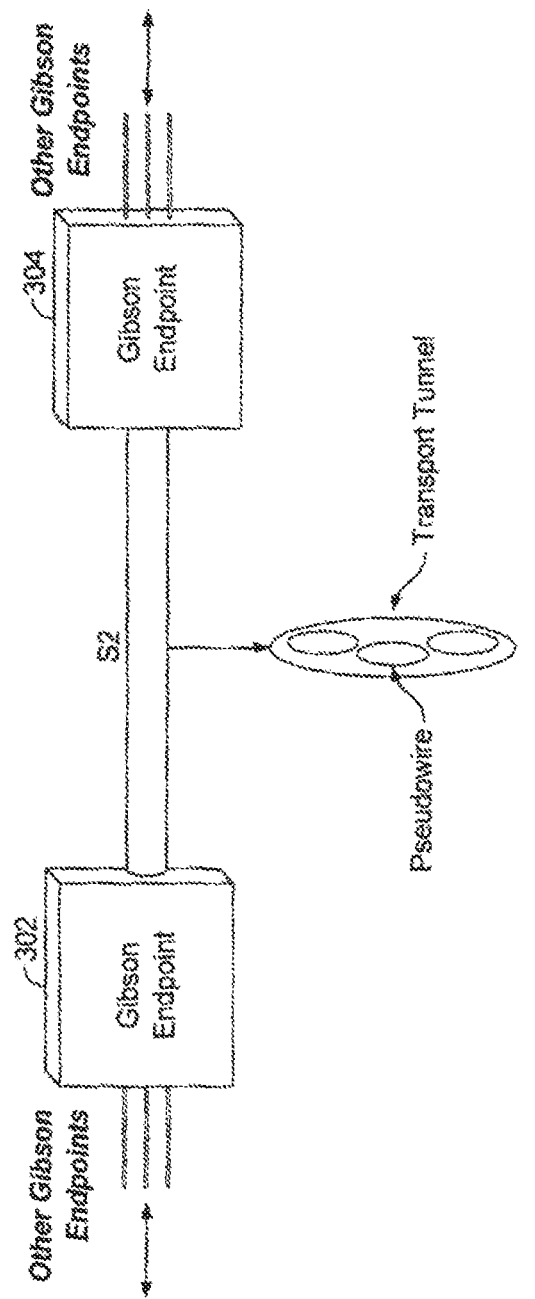
FIG. 5 is a block diagram illustrating an embodiment of a GIBSON S2 interface.

FIG. 5 is a block diagram illustrating an embodiment of a GIBSON S2 interface. Between two GIBSON endpoints 302 and 304, user data flows are encapsulated as Pseudowires and aggregated into transport tunnels according to the criteria provided from the management-plane.

Each GIBSON Pseudowire may consist of multiple user data flows. As an example, multiple VoIP calls (all in RTP) going between two GIBSON endpoints may share the same Pseudowire header. In this case, the GIBSON Pseudowire may be over-provisioned with a fixed bandwidth, which is computed based on call arrival and departure distribution at the business level, and downloaded to the GIBSON endpoints via the management plane. This may be a good technique to transport a large number of short-lived voice calls over packet networks with service guarantees. This can potentially reduce the number of control-plane messages during call setup.

Each transport tunnel may aggregate multiple GIBSON Pseudowires. The transport tunnel could be any type preferred by service providers. In addition, GIBSON supports the nesting of Pseudowires so that Pseudowires can be used to create transport tunnels that transit multiple lower-level tunnel technologies. See the description on "virtual segments" below.

The Pseudowire aggregation process may be bounded by the business policies distributed via the management-plane. The policies may determine the allocation of Pseudowires into transport tunnels, and the modification of transport tunnels to accommodate Pseudowire network resource consumption.

Figure 6:
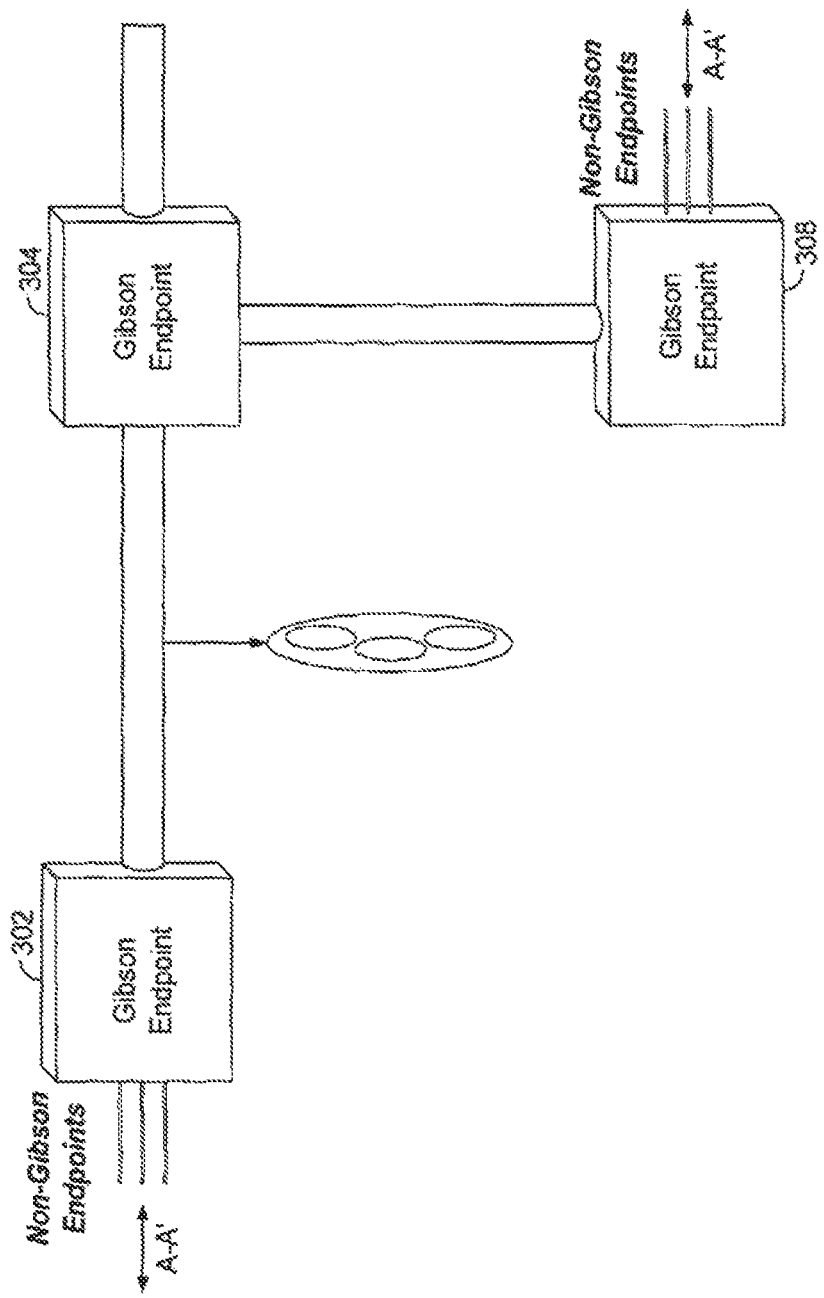
FIG. 6 is a block diagram illustrating an embodiment of a GIBSON S3 interface.

FIG. 6 is a block diagram illustrating an embodiment of a GIBSON S3 interface. Within the network, the intermediate GIBSON endpoints 302, 304, and 306 may terminate the transport tunnels, and switch the Pseudowires into another set of tunnels toward their destination. At GIBSON Pseudowire setup time, each Pseudowire request message may carry information such as QoS, protection and congestion control data and user flow information.

Figure 8:
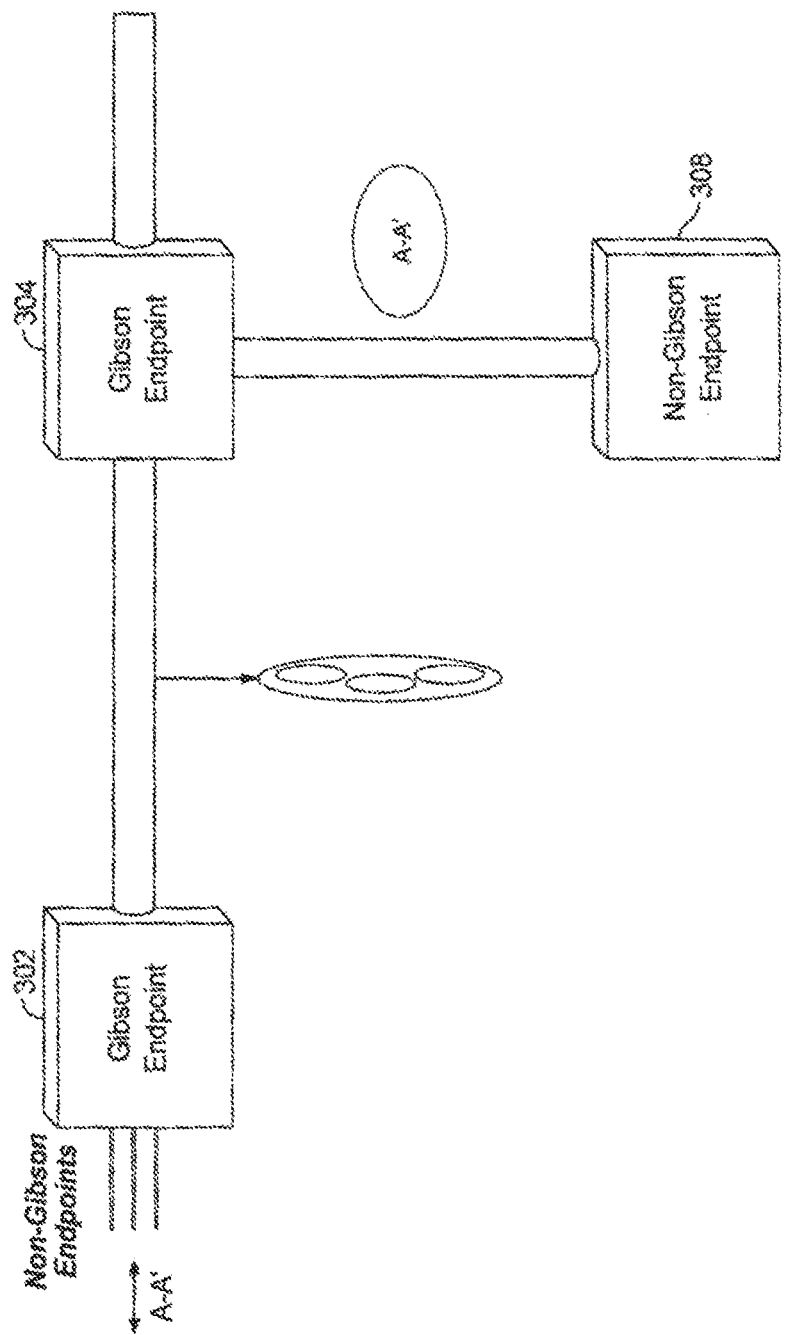
FIG. 8 is a block diagram illustrating an embodiment of a GIBSON S4 interface.

FIG. 8 is a Mock diagram illustrating an embodiment of a GIBSON S4 interface. When interfacing with non-GIBSON-enabled nodes, the GIBSON endpoints may terminate the Pseudowires and forward the original user's traffic. If the network between GIBSON and Non-GIBSON Endpoints does not have per-flow service guarantees, the service providers may be notified about partial service guarantees on data flows, flow information carried at Pseudowire setup time may permit the terminating process to map the flow correctly onto the egress network.

A GIBSON Pseudowire termination is a routable entity in GIBSON, so traffic can be routed onto a transport tunnel for delivery to the location where that tunnel terminates, using the nested Pseudowire property of GIBSON that is analogous to nested ISPs or the ATM VCI/VPI hierarchy. Disclosed is an additional enhancement to GIBSON to facilitate the definition of a set of GIBSON Pseudowires as a virtual segment.

A virtual segment is a collection of GIBSON Pseudowires that operate as a transport subnetwork. The virtual segment is bounded by GIBSON endpoints, and at these endpoints the services of the subnetwork are uniformly available. This virtual segment is treated as a GIBSON segment, so that traffic can be routed onto it. When the GIBSON virtual segment is addressed as a hop in a GIBSON Pseudowire, the routing logic may resolve the request to the nearest GIBSON endpoint on-ramp to the virtual segment.

GIBSON virtual segments can enclose any of the following:
1. A network of GIBSON Pseudowires.
2. A network of MPLS LSPs or other tunnels.
3. A multipoint network based on 2547bis (IETF RFC 4364, E. Rosen, et al, "BGP/MPLS IP Virtual Private Networks (VPNs)") or other multipoint technologies.

The last option is more fully described below.

Figure 9:
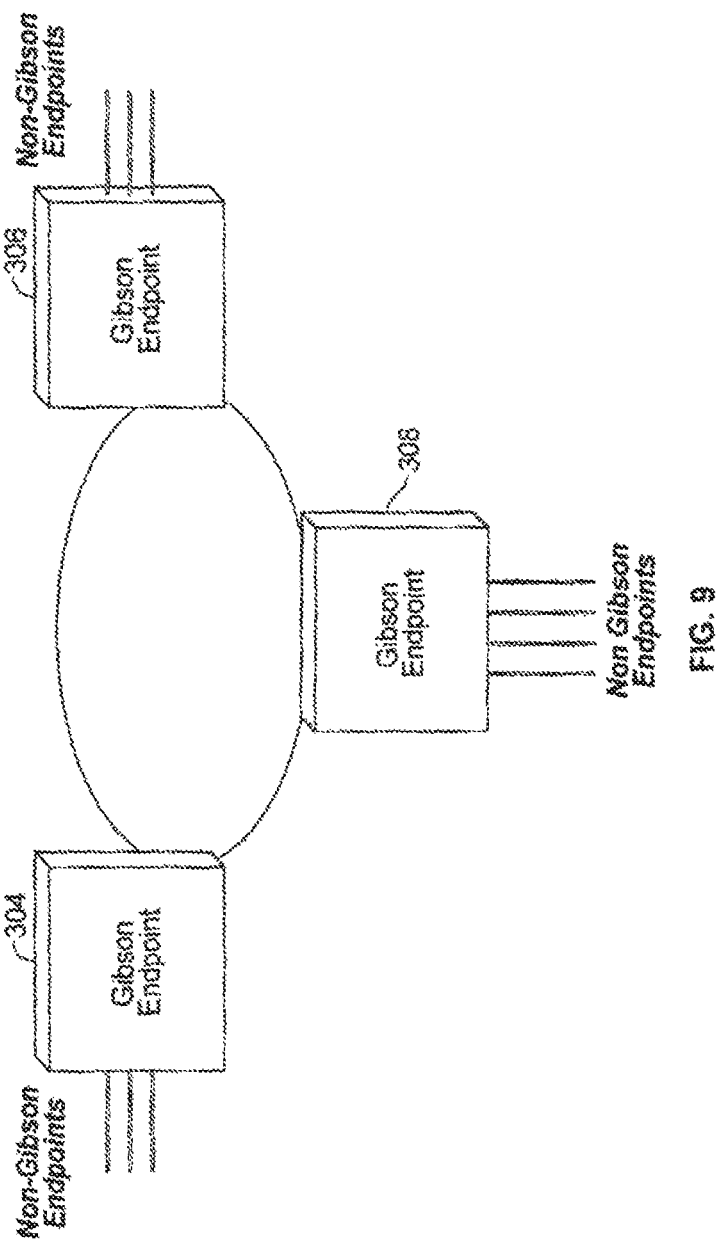
FIG. 9 is a block diagram illustrating an embodiment of a GIBSON S5 interface.

FIG. 9 is a block diagram illustrating an embodiment of a GIBSON S5 interface. In some embodiments, GIBSON supports natural multipoint service behavior by enveloping the multipoint technology as a virtual segment. GIBSON Pseudowires routed to the multipoint virtual segment may be forwarded to the nearest on-ramp (a GIBSON endpoint), where the outer GIBSON envelope may be stripped and the GIBSON endpoint destination address may be decoded from the header. The packet may then be forwarded to the GIBSON endpoint destination using the multipoint technology of the virtual segment. At that endpoint, a GIBSON header may be added and the Pseudowire may continue as though the tunnel was continuous, but no Pseudowire meshing may be required within the virtual segment.

The GIBSON endpoints can interface with the management-plane to discover network topology. In turn, it can use a VPN mechanism, such as the ones used in MPLS, to construct point-to-multipoint VPN networks. Note that the Pseudowire is not multipoint in itself, but it can be routed over a multipoint transport process.

Figure 10:
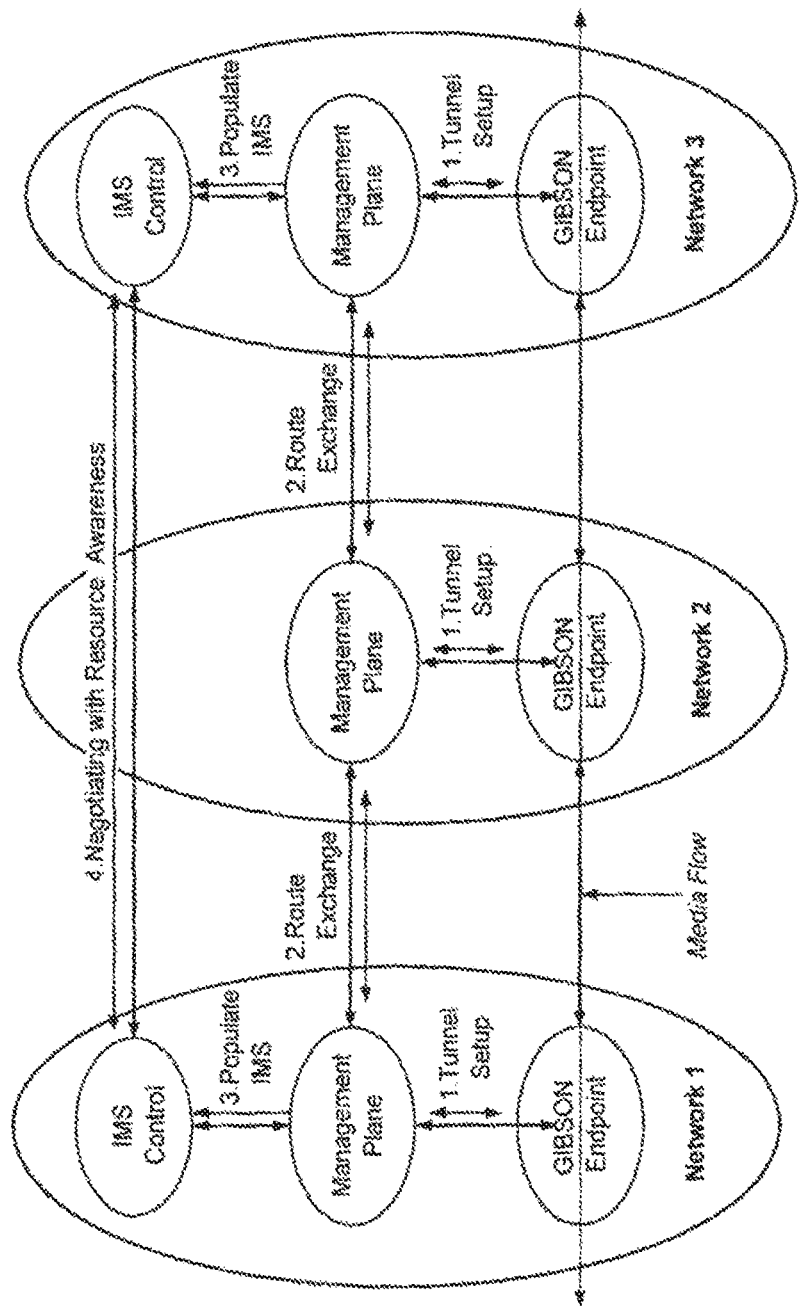
FIGS. 10-12 are block diagrams illustrating an embodiment of an example user case IMS.
Figure 11:
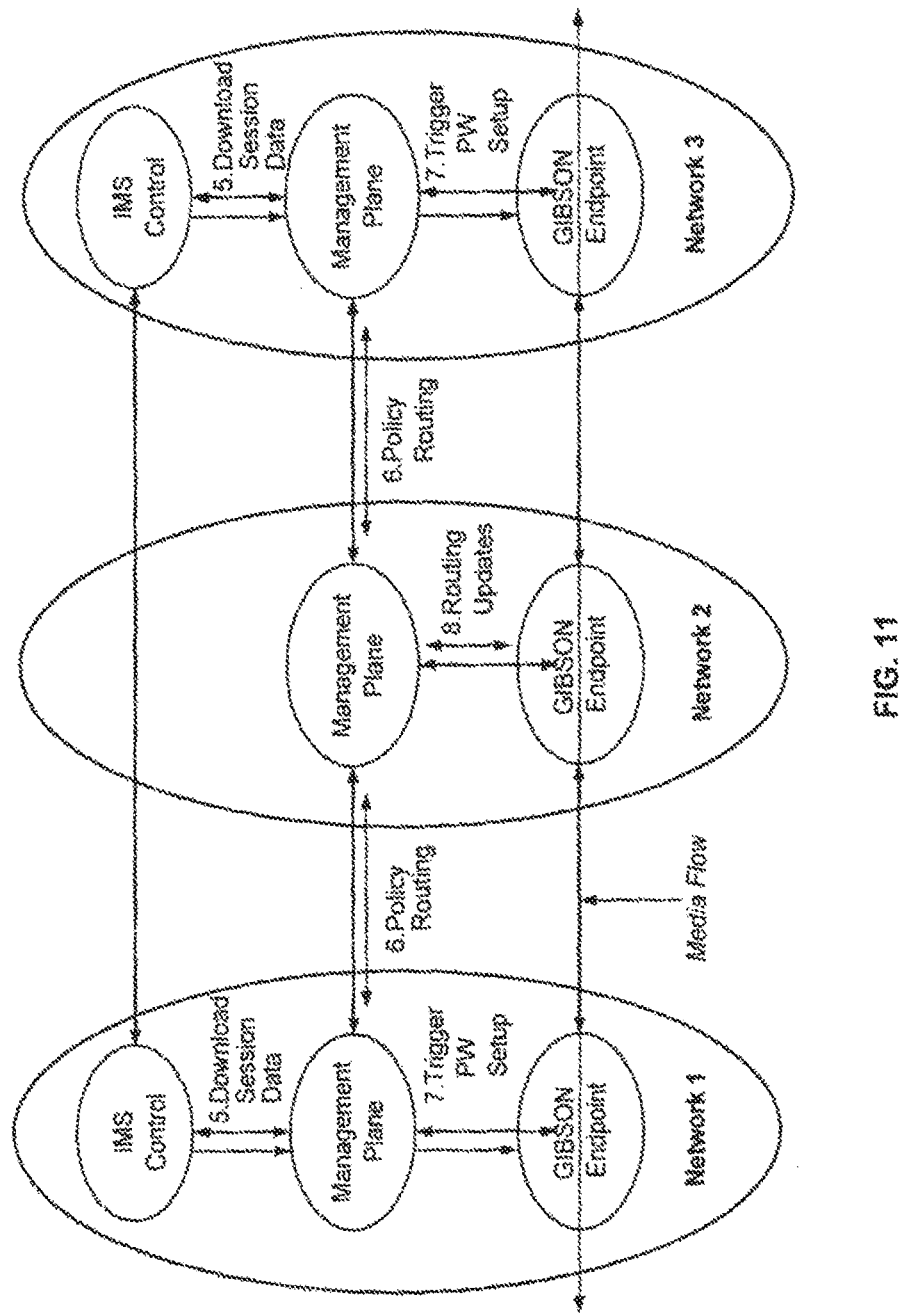
Figure 12:
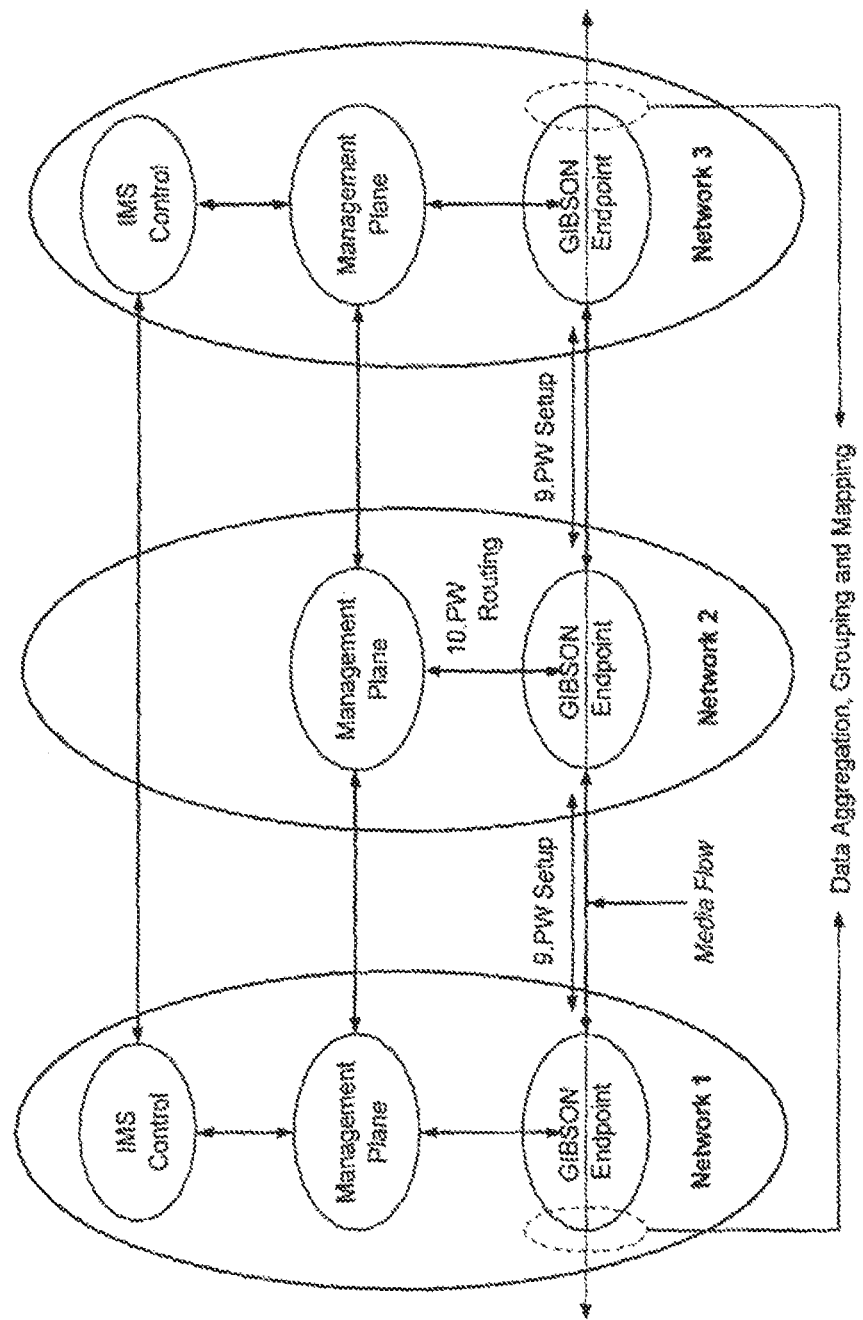

FIGS. 10-12 are block diagrams illustrating an embodiment of an example user case for IMS. The GIBSON architecture can apply to a number of services. As shown in FIG. 1, it can provide service guarantees for multimedia applications in a heterogeneous networking environment. In this example, an example using an IMS application is presented.

IMS uses SIP for end-to-end session setup. Each Session can be a VoIP call, a VoD session or a text messaging connection. The default data transport protocol is RTP. One of the characteristics of SIP-based communication is that the control-plane is out-of-band. As a result, media traffic may take a path that is completely different from the one taken by SIP control messages. In some networks, service providers cannot control the media traffic other than forwarding them as IP packets, and rely on DiffServ for QoS.

Since VoIP traffic does not require much bandwidth and is well behaved (mostly CBR), service providers do not need to be overly concerned about end-to-end service guarantees. However, for high-volume broadband customers, video stream service guarantee may become important.

How GIBSON can provide service guarantees for SIP-based data traffic is presented.

The following steps correspond to FIGS. 10-12.

1. Initially, GIBSON Endpoints in Networks 1, 2 and 3 may set up transport tunnels among each other. The transport tunnels are either initiated by the management-plane or by the network operators. In the latter case, the tunnel information may be reported to the management-plane.

2. Through the management-plane, the networks may exchange resource and topology information. The information may only be specific and relevant to the services that the network owners have agreed to support.

3. Access networks 1 and 3 have their own IMS (a.k.a. IMS domains). Through the management-plane, the IMS may populate the database (e.g. HSS) with relevant network resource information.

4. The end users in both networks may negotiate multimedia sessions via CSCF. During session negotiation, network resource availability may become one of the key parameters. If there are not enough resources between Networks 1, 2 and 3 for a particular session, CSCF may reject the session.

5. When the sessions have been established, IMS may notify the management-plane about the session data flow information (that is, RTP session).

6. The management-plane exchanges network resource information among each other.

7. The management-plane downloads the data flow information to the GIBSON Endpoints in Networks 1 and 3.

8. In transit network 2, the management-plane may compute the routes from Networks 1 and 3, and download the routing information to the GIBSON Endpoint. The route computation algorithm is governed by the service itself, which may override a SPF/BGP path computation. Further, the management-plane is not necessarily the right place for route computation. As described before, the management-plane may interface with Route Servers for such tasks.

9. The GIBSON Endpoints in Networks 1 and 3 may setup Pseudowires for the session media flow. The Pseudowire type depends on the application itself. In this case, a GIBSON Endpoint may choose IP as the Pseudowire type.

10. When Pseudowire setup messages arrive at Network 2, the GIBSON Endpoints may use pro-installed policy routes to direct the Pseudowires toward Network 3.

11. When end-user data traffic in Networks 1 and 3 arrive at the GIBSON Endpoints, they may be mapped to the corresponding Pseudowires. In this case, the GIBSON Endpoints may classify each packet based on its IP source and destination address, and UDP source and destination port numbers, all of which have been downloaded from the management-plane in Step (7).

In this case, two levels of admission control may take place. At the control-plane, management-plane provides network resource information to IMS, which may result in call admission control at SIP setup time. At the data-plane, management-plane provides per-session flow information to GIBSON Endpoints, which may aggregate each user flow in the form of a Pseudowire to transport tunnels.

As a result, data flows may have QoS guarantees throughout the network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by a first node device of a first network associated with a first service provider identity, an application flow specified by an application header of a data packet directed to a second network comprising a second node device and associated with a second service provider identity;
   encapsulating the data packet with a pseudowire label determined based on the application flow; and
   selecting, based on the application flow, a routing policy from a set of application-specific routing policies defined for the first network, wherein the routing policy specifies that the data packet is to traverse through at least a third network, comprising a third node device and associated with a third service provider identity, in transit to the second network.

2. The method of claim 1, further comprising sending the data packet via a pseudowire corresponding to the pseudowire label in accordance with the routing policy, wherein the pseudowire spans the first network and the second network.

3. The method of claim 2, wherein the sending comprises selecting the pseudowire from a plurality of pseudowires associated with respective different application flows including the application flow.

4. The method of claim 1, wherein the first network and the second network comprise respective different network technologies, and one of the respective different network technologies comprises at least one of an ethernet technology, a multiprotocol label switching technology, a provider backbone bridging/provider backbone transport technology, or an optical technology.

5. The method of claim 1, wherein the determining comprises searching the application header in response to determining that the data packet satisfies a business policy associated with the first service provider entity.

6. The method of claim 1, further comprising receiving, as the data packet, at least one of a voice data packet, an audio data packet, or a video data packet.

7. A system, comprising:
   a processor, coupled to a memory that stores instructions, that executes or facilitates execution of the instructions to at least:
      determine an application flow identified by an application header of a data packet received at a first node device of a first network associated with a first service provider identity, wherein the data packet is directed to a second network comprising a second node device and associated with a second service provider identity;
      encapsulate the data packet with a pseudowire label selected based on the application flow; and
      select, based on the application flow, a routing policy of a set of application-specific routing policies associated with the first network, wherein the routing policy defines that the data packet is to traverse at least a third network, comprising a third node device and associated with a third service provider identity, in transit to the second network.

8. They system of claim 7, wherein the processor further executes or facilitates execution of the instructions to send the data packet via a pseudowire corresponding to the pseudowire label based on the routing policy.

9. The system of claim 8, wherein the pseudowire extends between the first network and the second network.

10. The system of claim 8, wherein the processor further executes or facilitates execution of the instructions to select the pseudowire from a set of pseudowires associated with respective different application flows including the application flow.

11. The system of claim 8, wherein the routing policy further specifies a maximum number of simultaneous voice sessions to be conducted via the pseudowire.

12. The system of claim 7, wherein the first network comprises a first network technology and the second network comprises a second network technology that is different from the first network technology.

13. The system of claim 12, wherein at least one of the first network technology or the second technology comprises at least one of an Ethernet technology, a multiprotocol label switching technology, a provider backbone bridging/provider backbone transport technology, or an optical technology.

14. The system of claim 7, wherein the processor further executes or facilitates execution of the instructions to search the application header to determine the application flow in response to a determination that the data packet satisfies a business policy associated with the first service provider identity.

15. The system of claim 7, wherein the data packet comprises at least one of a voice data packet, an audio data packet, or a video data packet.

16. The system of claim 7, wherein the routing policy further instructs that the data packet is to traverse at least the third network via a specified data tunnel.

17. The system of claim 7, wherein the routing policy further specifies a maximum bandwidth for voice data traffic via the pseudowire.

18. A non-transitory computer-readable medium comprising instructions that, in response to execution, cause a first node device, which comprises a processor and is part of a first network associated with a first service provider identity, to perform operations, the operations comprising:
   determining an application flow identified by an application header of a data packet received at the first node device, wherein the data packet is directed to a second network comprising a second node device and associated with a second service provider identity;
   determining a pseudowire label based on the application flow;
   encapsulating the data packet with the pseudowire label; and
   selecting, based on the application flow, a routing policy of a set of application-specific routing policies associated with the first network, wherein the routing policy specifies that the data packet is to traverse to the second network via at least a third network comprising a third node device and associated with a third service provider identity.

19. The non-transitory computer-readable medium of claim 18, wherein the operations further comprise:
   selecting, based on the application flow, a pseudowire of a plurality of pseudowires associated with respective different application flows; and
   sending the data packet via the pseudowire.

20. The non-transitory computer-readable medium of claim 18, wherein the data packet comprises at least one of a voice data packet, an audio data packet, or a video data packet.

* * * * *